2,931,574

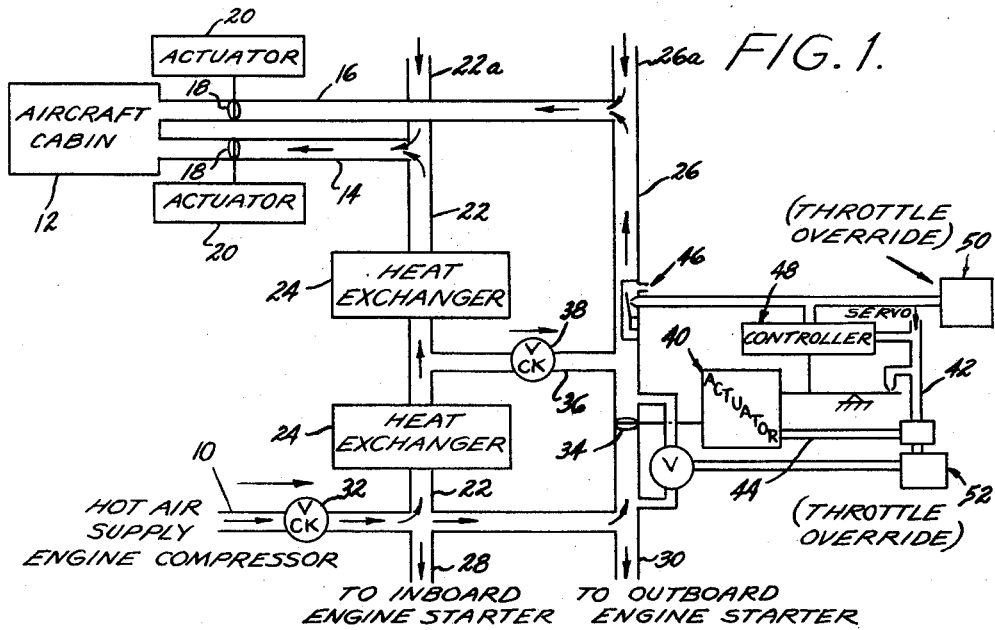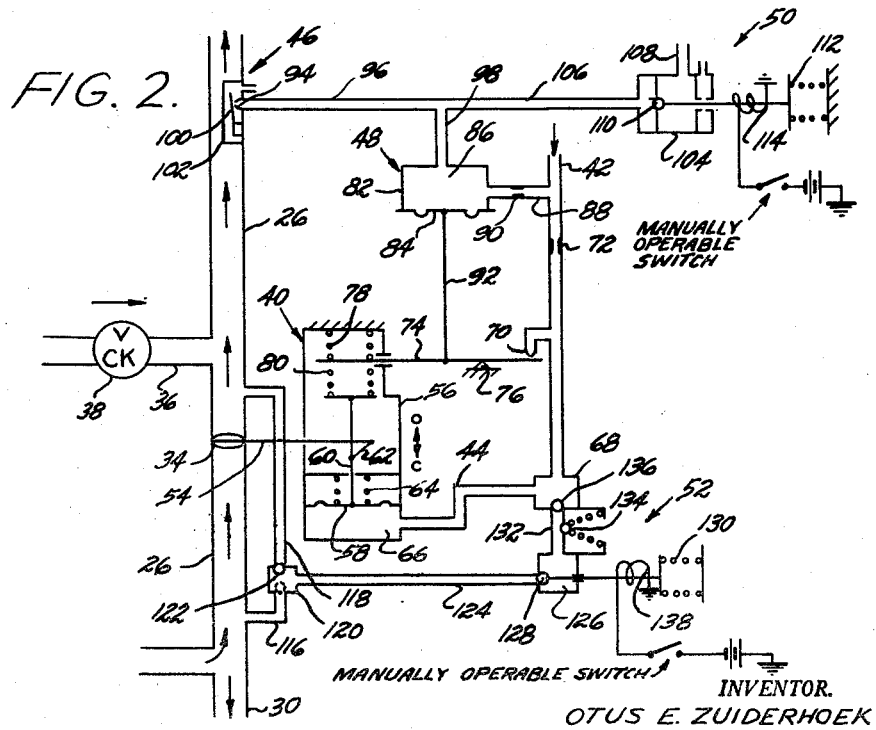

VALVE AND CONTROL MEANS FOR AN AIRCRAFT AIR CONDITIONING SYSTEM

Otus E. Zuiderhoek, Glastonbury, Conn., assignor to United Aircraft Corporation, East Hartford, Conn., a corporation of Delaware Application August 23, 1957, Serial No. 679,918

6 Claims. (Cl. 236—1)

This invention relates to an aircraft air conditioning system of the type utilizing hot compressed air as the supply, a portion of the air being refrigerated and a portion of the air being maintained at a relatively high temperature so that temperature control in the aircraft cabin or other compartments can be effected by mixing the supply from a hot air line and from a cold air line. The specific improvements provided in accordance with this invention are involved in the construction of a throttle valve and temperature responsive control means therefor in the hot air line, these improvements including manually operable means for overriding the automatic temperature responsive control means to close the said throttle valve, and the improvements also include additional manually operable means for overriding the temperature responsive control means to open the said throttle valve.

It is the general object of the invention to provide in an aircraft air conditioning system of the aforementioned type automatic temperature responsive control means for operating a throttle valve in an air supply line, for example, the hot air line whereby to maintain air temperature at or near a desired level, and a further object of the invention is to provide means which may be manually actuated to close the throttle valve for certain desired purposes and to provide additional manually actuated means to open the throttle valve for other purposes.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing

Fig. 1 of the drawing is a schematic view of an aircraft air conditioning system incorporating a throttle valve and control means therefor provided in accordance with the present invention; and Fig. 2 is a further more detailed schematic view of the throttle valve and throttle valve control means constituting the specific improvements of this invention.

An aircraft air conditioning system of the type to which the present invention is particularly applicable utilizes hot compressed air as the supply for all purposes of the system. The aircraft engine compressor provides a convenient source of supply air which may be introduced to the system as shown in Fig. 1 through an inlet duct or conduit 10. The air introduced to the system is ultimately to be used in conditioning the aircraft cabin 12 and is introduced thereto through a cold air duct 14 and a hot air duct 16. Each of the cold and hot air ducts opening into the cabin may have a throttle valve 18 disposed therein for operation by a suitable actuator 20 whereby the volume of hot and cold air introduced to the cabin 12 can be controlled to control the air temperature within the cabin. A portion of the hot compressed air from the supply conduit 10 is directed through a conduit 22 and is refrigerated by passing through a plurality of cooling devices 24, 24, designated generally as heat exchangers, and the conduit 22 is connected to the cabin inlet conduit 14 to supply cold air thereto. The rest of the hot compressed air from the inlet conduit 10 is directed through a duct or conduit 26 which is connected with the cabin inlet conduit 16 to supply hot air therefor. The conduit 22 may hereinafter be referred to as the cold air supply line and the conduit 26 may hereinafter be referred to as the hot air supply line.

When an aircraft air conditioning system of the type under consideration here is adapted for use on a multi-engine aircraft, it is desirable to utilize air from the compressors of at least two of the engines. In such case, there may be two inlet ducts such as the duct 10 for the system, one duct (not shown) being connected with a second cold air supply line 22a and a second hot air supply line 26a. The ducts 22 and 22a and 26 and 26a are connected together as shown in Fig. 1 to supply the cabin inlet ducts 14 and 16 respectively. Since the apparatus and elements in the system between any second system inlet 10 and the cold and hot air lines 22a and 26a are or can be duplicates of the apparatus and elements shown in Fig. 1, a second showing of such elements is deemed to be unnecessary.

An additional use for the hot compressed air introduced to the air conditioning system is in starting the engines. That is, the compressed air flowing in the air conditioning system conduits may be connected to the compressed air or pneumatic starters for the aircraft engine. For example, a line 28 can be connected between the inboard engine starter and the inlet 10 and a line 30 can be connected between the outboard engine starter and the inlet 10 on one side of the aircraft while similar lines are connected to the inboard and outboard engine starters on the other side of the aircraft. It will be observed that the starter lines or conduits 28 and 30 are in free communication with the hot air supply ducts 26 and 26a. Thus, in starting a multi-engine aircraft, a source of compressed air can be connected to the inlet 10 on one side of the aircraft to provide compressed air which will flow to the engine starters on both sides of the aircraft by passage through the conduits 26 and 26a. After one engine has been started, its compressor can be connected to the inlet 10 to supply air under pressure for starting the rest of the engines. During aircraft engine starting operations, the throttle valves 18, 18 in the cabin inlet conduits are preferably closed and any valve or valves in the hot air supply lines 26 and 26a are fully opened. After the engines have been started, valves (not shown) are closed in the starter conduits, such as the conduits 28 and 30, so that all air then introduced to the system is utilized in air conditioning. It will be observed that a check valve 32 is provided in the system inlet so as to prevent loss of air pressure through a non-operating engine compressor during engine starting operation.

It will be observed that a throttle valve 34 is provided in the hot air line 26. This valve must, of course, be opened when the system is utilized in engine starting. When the system is utilized for air conditioning, the throttle valve is opened and closed for modulation and temperature control.

The throttle valve 34 is closed in the hot air line 26 only when the temperature of the air therein is too high or so high that it cannot be mixed with the cold air supply to provide a comfortable cabin temperature. When the valve 34 is closed, cooler air is introduced to the hot air line 26 from a conduit 36 which extends from the cold air conduit 22. The conduit 36 is connected to the cold air conduit 22 between the heat exchangers 24, 24 so that air passing into the hot air line 26 will have been cooled by at least one stage of refrigeration. A check valve 38 is provided in the conduit 36 to permit such flow automatically when the throttle valve 34 is closed, thereby reducing downstream pressure in the hot air line 26.

The means effecting control of the throttle valve 34 includes a pressure responsive valve actuator 40 which is operated by servo pressure introduced thereto through a duct 42 and a duct 44, a temperature responsive transducer indicated generally at 46 to control pressure in a controller 48 which in turn effects control of the servo pressure to the actuator 40. In addition to the aforesaid elements, the valve control means includes a first manually actuated override 50 which is operated to cause the throttle valve 34 to close, and a second manually actuated override 52 which is operated to cause the throttle valve 34 to open. The throttle valve control means will now be described in greater detail with reference to Fig. 2.

In preferred form, the throttle valve 34 is of the butterfly type having a shaft 54 which can be rotated to open and to close the throttle valve within the hot air line 26. The preferred actuator 40 for the aforesaid throttle valve comprises a housing 56 wherein a diaphragm type piston 58 is supported for reciprocation. A piston rod 60 is secured to the piston and connected to the valve shaft 54 as by a link 62 whereby to translate rectilinear movement of the diaphragm-piston into rotation of the valve. In the particular arrangement shown, the diaphragm-piston 58 is urged in one direction by a spring 64 to effect closing movement of the throttle valve 34, and it is urged in the other direction by fluid pressure within the chamber 66 to effect opening movement of the throttle valve 34. As previously mentioned, fluid under pressure is introduced to the actuator chamber 66 by means of the conduits 42 and 44 which are connected together at a union 68. The conduit 42 is connected to a suitable source of fluid (preferably air) under pressure which may hereinafter be referred to as the servo source. The servo source is preferably provided at a substantially constant pressure and pressure within the servo conduit 42 and thus within the actuator chamber 66 is varied by varying the effective opening at an orifice 70 which communicates with the servo conduit 42. A pressure stabilizing restrictor 72 is provided in the conduit 42 on the upstream side of the orifice 70.

The effective opening at the orifice or valve 70 is controlled by a lever 74 which is pivoted on a fulcrum 76. The free end of the lever 74 extends into the valve actuator 40 wherein it is engaged in opposed relationship by a pair of springs 78 and 80, the spring 80 being seated on the piston rod 60 whereby feedback movement is provided for the lever 74 to adjust its position in accordance with the position of the throttle valve 34 and the position of the valve actuator piston in keeping therewith. The pivoted lever 74 is moved primarily to change the effective opening of the orifice 70 and to control valve operation by means of the pressure responsive controller 48. The said controller 48 comprises a housing 82 wherein a diaphragm-piston 84 is disposed for movement responsive to pressure within a chamber 86. Servo pressure is introduced to the chamber 86 through a duct 88 connected with the servo conduit 42 and containing a restriction 90. The diaphragm-piston 84 is connected to the pivoted lever 74 by a rod or link 92, and the arrangement is such as to provide for orifice-closing movement of the lever 74 responsive to a pressure increase in the chamber 86 and to provide orifice-opening movement of the lever responsive to a pressure decrease in the chamber 86. Orifice-closing movement will, of course, increase the valve actuator pressure to open the throttle valve 34 and orifice-opening movement will decrease the valve actuator pressure to cause throttle valve closing movement.

As was mentioned previously, the pressure within the controller 48 is controlled by a temperature responsive transducer 46. This transducer may take any suitable form, for example, the temperature responsive transducer shown in the application of Radtke and Farkus, Ser. No. 675,091, filed July 30, 1957, assigned to the assignee of the present application, is quite suitable for the purpose. This transducer includes an orifice 94 which is connected for free communication with the controller chamber 86 as by the ducts 96 and 98. The orifice 94 is disposed within the hot air line 26, and a bimetallic element 100 is located therein to move relative to the orifice and control the effective opening thereof. In the particular arrangement shown, the bimetallic element is adapted to move away from the orifice 94 and thus to enlarge its effective opening with a temperature increase in the hot air line and to close or reduce the effective opening of the orifice 94 with a temperature decrease. A casing or shell 102 surrounds the orifice and the bimetallic temperature sensitive element within the hot air line 26 so that the transducer will not be affected by changes of pressure within the hot air line. Obviously, as the effective opening of the orifice 94 is enlarged with an increase in the hot air temperature, the pressure in the controller chamber 86 will be reduced whereby the throttle valve is closed or moved toward closed position. Also, when the orifice 94 is closed or restricted as a result of temperature decrease in the hot air line 26, the pressure in the controller chamber 86 is increased whereby to effect opening movement of the throttle valve 34 in the hot air line.

The control means for the throttle valve 34 as thus far described comprises all of the elements necessary for automatic operation to position the throttle valve 34 in the hot air line 26 responsive to and in keeping with the air temperature downstream of the throttle valve. Attention is now directed specifically to the means 50 utilized to override the automatically operable control means for the purpose of closing the throttle valve 34 when desired.

In general terms, the override means 50 may be referred to as a solenoid operated vent valve for the controller 48. More specifically, the override means comprises a valve housing 104 which is connected with the controller chamber 86 as by the conduit 98 and a conduit or duct 106. The housing 104 also has a vent 108 and a valve 110 which is biased as by a spring 112 to close or prevent communication between the controller conduit 106 and the vent conduit 108. Thus, normally the valve 110 is positioned so as to have no effect upon the automatic operation of the control means for the throttle valve 34. However, whenever a solenoid 114 is energized to open the valve 110, the controller chamber 86 is vented to the conduits 98 and 106 and the vent 108. Under such condition, air pressure in the valve actuator 40 is reduced so that the throttle valve 34 will move to a fully closed position in the hot air line 26.

The second manually actuated means 52 for overriding the automatically operable control means for the throttle valve 34 is adapted to cause the throttle valve 34 to be opened. The said overriding means 52 may be characterized generally as a normally closed valve which when opened will permit the passage of air at duct pressure from the hot air line 26 to the valve actuator 40 so as to force the throttle valve 34 into fully open position in the hot air line. The aforesaid valve is most often opened for the purpose of opening the hot air line to the free passage of air under pressure therein for the purpose of starting the aircraft engine. As best shown in Fig. 2, the control override means 52 includes a duct 116 and a duct 118 which are connected with and communicate with the hot air line 26 on the upstream and downstream sides, respectively, of the throttle valve 34. The ducts 116 and 118 are connected together in a union 120 having a valve 122 disposed therein which closes whichever of the ducts 116 or 118 has the lesser pressure. The valve 122 is arranged to be freely movable responsive to the pressure in the ducts 116 and 118. A conduit 124 extends from the union 120 into a chamber 126 defined within suitable means and wherein a valve 128 is biased as by a spring 130 normally to close the conduit 124. Another conduit 132 extends from the chamber 126 into the union 68 which interconnects the conduit 44 and the servo conduit 42. A spring biased pressure relief valve 134 is normally closed in the conduit 132, and another valve 136 normally closes the end of the conduit 132 in the union 68. That is, since the valve 128 in the chamber 126 is normally closed, there will be no pressure in the conduit 132 and the valve 136 is positioned to close the end of the conduit 132 within the union 68 by the servo pressure in the servo conduit 42.

Whenever a solenoid 138 is energized, the valve 128 is opened whereupon air at duct pressure in the hot air line 26 enters the chamber 126 and the conduit 132. This duct pressure causes the valve 136 to be opened against the lesser servo pressure and thus air at the pressure existing within the hot air line 26 is introduced to the valve actuator chamber 66 to fully open the throttle valve 34.

While each of the control override means 50 and 52 can be operated independently to cause closing and opening, respectively, of the throttle valve, the override means 52 when actuated will cause opening movement of the throttle valve even if the override 50 has been actuated to effect closing movement thereof. That is, the valves 128 and 136 in the control means will be opened to direct duct pressure to the throttle valve actuator no matter what pressure exists in the servo conduit 42 wherein the maximum servo pressure is substantially less than duct pressure under any and all anticipated operating conditions.

The invention claimed is:

1. In an aircraft air conditioning system which includes an air supply line and a throttle valve therefor, improved throttle valve control means comprising in combination, a fluid pressure responsive actuator operatively connected with the throttle valve and connectible with a source of fluid under pressure, means defining a vent orifice the effective opening of which may be varied to adjust the operating pressure in said actuator, pressure operated means responsive to temperature in said air line for controlling the effective opening of said vent orifice whereby automatically to position the throttle valve in keeping with temperature in the air supply line, and selectively operable means for overriding the aforesaid automatic temperature responsive control means to place the throttle valve in a predetermined position, the said overriding means comprising conduit means connecting said air supply line on both sides of said throttle valve with the throttle valve actuator and a valve normally closed in said conduit means but which is adapted to be opened whereby to admit air at supply line pressure to the actuator from either side of said throttle valve whereby to place the throttle valve in the said predetermined position.

2. In an aircraft air conditioning system which includes an air supply line and a throttle valve therefor, improved throttle valve control means comprising in combination, a fluid pressure responsive actuator operatively connected with the throttle valve and having a servo supply conduit connectible with a source of fluid under pressure, means defining a vent orifice the effective opening of which may be varied to adjust the operating pressure in said actuator, pressure operated means responsive to temperature in said air line for controlling the effective opening of said vent orifice whereby automatically to position the throttle valve in keeping with temperature in the air supply line, and selectively operable means for overriding the aforesaid automatic temperature responsive control means to place the throttle valve in a predetermined position, the said overriding means comprising conduit means connecting said air supply line on both sides of the throttle valve with the servo supply conduit for the throttle valve actuator, and a valve normally closed in said conduit means but which is adapted to be opened whereby to admit air at supply line pressure to the actuator from either side of said throttle valve whereby to place the throttle valve in the said predetermined position.

3. In an aircraft air conditioning system which includes an air supply line and a throttle valve therefor, improved throttle valve control means comprising in combination, a fluid pressure responsive actuator operatively connected with the throttle valve and connectible with a source of fluid under pressure, means defining a vent orifice the effective opening of which may be varied to adjust the operating pressure in said actuator, pressure operated means for controlling the effective opening of said vent orifice and including a transducer responsive to temperature in the supply line whereby automatically to position the throttle valve in keeping with supply line temperature, first selectively operable means for overriding the automatic temperature responsive control means to place the throttle valve in a first predetermined position and comprising a vent for the pressure operated means and a valve normally closing the vent but which is adapted to be opened, and second selectively operable means for overriding the automatic temperature responsive means to place the throttle valve in a second predetermined position and comprising conduit means connected to the throttle valve actuator and selectively connectible with said air supply line on the side of the throttle valve therein having the highest pressure, and a valve normally closing said conduit means but which is adapted to be opened whereby to admit air at supply line pressure to the actuator from either side of said throttle valve whereby to place the throttle valve in the said second predetermined position.

4. In an aircraft air conditioning system which includes an air supply line and a throttle valve therefor, improved throttle valve control means comprising in combination, a fluid pressure responsive actuator operatively connected with the throttle valve and connectible with a source of fluid under pressure, means defining a vent orifice the effective opening of which may be varied to adjust the operating pressure in said actuator, pressure operated means for controlling the effective opening of said vent orifice and including a transducer responsive to temperature in the supply line whereby automatically to position the throttle valve in keeping with supply line temperature, first selectively operable means for overriding the automatic temperature responsive control means to place the throttle valve in a first predetermined position and comprising a vent for the pressure operated means and a valve normally closing the vent but which is adapted to be opened, and second selectively operable means for overriding the automatic temperature responsive means to place the throttle valve in a second predetermined position and comprising conduit means connecting said air supply line on both sides of the throttle valve with the throttle valve actuator, and a valve normally closing said conduit means but which is adapted to be opened whereby to admit air at supply line pressure to the actuator from either side of said throttle valve whereby to place the throttle valve in the said second predetermined position.

5. In an aircraft air conditioning system which includes an air supply line and a throttle valve therefor, improved throttle valve control means comprising in combination, a fluid pressure responsive actuator operatively connected with the throttle valve and having a servo supply conduit connectible with a source of fluid under pressure, means defining a vent orifice the effective opening of which may be varied to adjust the operating pressure in said actuator, pressure operated means for controlling the effective opening of said vent orifice including a lever movable with respect to the vent orifice and also including a transducer responsive to temperature in the supply line to move the lever whereby automatically to position the throttle valve in keeping with supply line temperature, first selectively operable means for overriding the automatic temperature responsive control means to place the throttle valve in a first predetermined position and comprising a vent for the pressure operated means and a valve normally closing the vent but which is adapted to be opened, and second selectively operable means for overriding the automatic temperature responsive control means to place the throttle valve in a second predetermined position and comprising conduit means connecting said air supply line on both sides of the throttle valve with the servo supply conduit for the throttle valve actuator, and a valve normally closing said conduit means but which is adapted to be opened whereby to admit air at supply line pressure to the actuator from either side of said throttle valve whereby to place the throttle valve in the said second predetermined position.

6. In an aircraft air conditioning system which includes an air supply line and a throttle valve therefor, improved throttle valve control means comprising in combination, a fluid pressure responsive actuator operatively connected with the throttle valve and connectible with a source of fluid under pressure, means defining a vent orifice the effective opening of which may be varied to adjust the operating pressure in said actuator, pressure operated means for controlling the effective opening of said vent orifice and including a transducer responsive to temperature in the supply line whereby automatically to position the throttle valve in keeping with supply line temperature, first manually actuated means for overriding the automatic temperature responsive control means to place the throttle valve in a first predetermined position and comprising a vent for the pressure operated means and a normally closed electrically opened valve associated with the vent, and second manually actuated means for overriding the automatic temperature responsive means to place the throttle valve in a second predetermined position and comprising conduit means connected to the throttle valve actuator and selectively connectible with said air supply line on the side of the throttle valve therein having the highest pressure, and a normally closed electrically opened valve disposed in said conduit means and operable when opened to admit air at supply line pressure to the actuator from either side of said throttle valve whereby to place the throttle valve in the said second predetermined position.

References Cited in the file of this patent

UNITED STATES PATENTS

| | | |
|---|---|---|
| 1,658,134 | McDermott | Feb. 7, 1928 |
| 1,853,194 | Bogle | Apr. 12, 1932 |
| 1,928,737 | Otto | Oct. 3, 1933 |
| 2,175,866 | Arnold | Oct. 10, 1939 |
| 2,202,286 | Gorrie | May 28, 1940 |
| 2,263,742 | Shivers | Nov. 25, 1941 |
| 2,599,534 | Annin | June 10, 1952 |
| 2,637,342 | Shannon | May 5, 1953 |
| 2,638,874 | Woodhull | May 19, 1953 |